(12) United States Patent
Schmitz et al.

(10) Patent No.: US 11,118,634 B2
(45) Date of Patent: Sep. 14, 2021

(54) TORQUE LIMITER

(71) Applicant: WASEDA UNIVERSITY, Tokyo (JP)

(72) Inventors: Alexander Schmitz, Tokyo (JP); Wei Wang, Tokyo (JP); Alexis Carlos Holgado, Tokyo (JP); Chincheng Hsu, Tokyo (JP); Kento Kobayashi, Tokyo (JP); Javier Alvarez Lopez, Tokyo (JP); Yushi Wang, Tokyo (JP); Shigeki Sugano, Tokyo (JP)

(73) Assignee: WASEDA UNIVERSITY, Tokyo (JP)

( * ) Notice: Subject to any disclaimer, the term of this patent is extended or adjusted under 35 U.S.C. 154(b) by 111 days.

(21) Appl. No.: 16/495,204

(22) PCT Filed: Feb. 24, 2018

(86) PCT No.: PCT/JP2018/006833
§ 371 (c)(1),
(2) Date: Sep. 18, 2019

(87) PCT Pub. No.: WO2018/173633
PCT Pub. Date: Sep. 27, 2018

(65) Prior Publication Data
US 2020/0025258 A1    Jan. 23, 2020

(30) Foreign Application Priority Data

Mar. 19, 2017  (JP) .............................. JP2017-053823

(51) Int. Cl.
*F16D 7/02* (2006.01)
*F16D 27/12* (2006.01)
(Continued)

(52) U.S. Cl.
CPC ............... *F16D 7/02* (2013.01); *F16D 27/12* (2013.01); *B25J 19/00* (2013.01); *B60W 30/188* (2013.01);
(Continued)

(58) Field of Classification Search
CPC ......... F16D 27/112; F16D 7/025; F16D 67/06
See application file for complete search history.

(56) References Cited

U.S. PATENT DOCUMENTS 2,547,137 A * 4/1951 Ochtman ................ F16D 7/025
                                                   192/84.93
2,966,977 A * 1/1961 Johnson ................ F16D 27/112
                                                   192/84.91
(Continued)

FOREIGN PATENT DOCUMENTS

JP      54-19045 A     2/1979
JP      58-115868 U    8/1983
(Continued)

OTHER PUBLICATIONS

Machine translation of JP 04-008834, retireved from www.j-platpat.inpit.go.jp (Year: 2021).*
(Continued)

*Primary Examiner* — Stacey A Fluhart
(74) *Attorney, Agent, or Firm* — Westerman, Hattori, Daniels & Adrian, LLP

(57) ABSTRACT

A torque limiter 10 includes an input unit 11 connected to a driving device M on input side, and an output unit 12 connected to a robot arm A on output side. The input unit 11 and the output unit 12 include a coupling structure in which the input unit 11 and the output unit 12 approach and recede from each other so as to enable switching of a connecting state where the input unit 11 and the output unit 12 are connected to each other and a non-connecting state where the input unit 11 and the output unit 12 are not connected to each other, through adjustment of magnetic force therebetween. The coupling structure includes an electromagnet 17 that enables adjustment of the magnetic force through adjustment of an application voltage.

9 Claims, 4 Drawing Sheets

(51) Int. Cl.
*F16D 27/112* (2006.01)
*B25J 19/00* (2006.01)
*B60W 30/188* (2012.01)
*F16D 67/06* (2006.01)

(52) U.S. Cl.
CPC .... *B60W 2710/0666* (2013.01); *F16D 27/112* (2013.01); *F16D 67/06* (2013.01)

(56) References Cited

U.S. PATENT DOCUMENTS

| | | | | |
|---|---|---|---|---|
| 3,455,421 | A | * | 7/1969 | Miller .................... F16D 27/112 192/84.961 |
| 4,397,380 | A | * | 8/1983 | Yew ........................ F16D 7/024 192/107 C |
| 2017/0037853 | A1 | * | 2/2017 | Modica ................... F16D 27/14 |

FOREIGN PATENT DOCUMENTS

| | | | |
|---|---|---|---|
| JP | 1-303326 | A | 12/1989 |
| JP | 4-8834 | U | 1/1992 |
| JP | H11-77554 | A | 3/1999 |
| JP | 11-247880 | A | 9/1999 |
| JP | 2001-3951 | A | 1/2001 |
| JP | 2002-86379 | A | 3/2002 |
| JP | 2007-187283 | A | 7/2007 |
| JP | 2013-76432 | A | 4/2013 |
| JP | 2015-85390 | A | 5/2015 |
| JP | 2015-200353 | A | 11/2015 |
| JP | 2017013207 | A * | 1/2017 ............ B25J 9/1633 |

OTHER PUBLICATIONS

International Search Report dated May 29, 2018, issued in counterpart International Application No. PCT/JP2018/006833 (2 pages).
Office Action dated Feb. 3, 2021, issued in counterpart JP Application No. 2017-53823, with English Translation. (10 pages).

* cited by examiner

TORQUE LIMITER

TECHNICAL FIELD

The present invention relates to a torque limiter, and more specifically to a torque limiter that makes a torque limit value as an upper limit value of torque transmitted from an input side to an output side variable, and considers safety at the time of unexpected power supply loss such as blackout, or emergency stop.

BACKGROUND ART

A torque limiter that interrupts transmission of torque transmitted from an input side to an output side when the torque exceeds a predetermined value to be in an overload state, has been well-known. Examples of the torque limiter include a torque limiter using an electromagnetic clutch that uses magnetic force by energization to transmit the torque from the input side to the output side as disclosed in Patent Literature 1.

In an environment where robots and humans coexist, safety measures of the robots to the environment are important. As the safety measures, it is important to design a robot so as not to influence humans and objects in an environment in a case where the robot unexpectedly collides with the humans or the objects while the robot performs desired operation, or the like. Accordingly, for example, installation of a configuration in which the torque limiter is disposed between a robot arm and a motor operating the robot arm, and transmission of the torque between the motor and the robot arm is interrupted when an overload occurs therebetween, is considered.

CITATION LIST

Patent Literature

Patent Literature 1: Japanese Patent Laid-Open No. 2015-200353

SUMMARY OF INVENTION

Technical Problem

In the torque limiter using the electromagnetic clutch disclosed in Patent Literature 1 or the like, however, power transmission from the input side to the output side by the electromagnetic clutch is interrupted in an non-energized state, which may deteriorate safety at the time of unexpected power supply loss such as blackout, or emergency stop. For example, in a case of the above-described configuration in which the motor is disposed on the input side and the robot arm is disposed on the output side, and the motor and the robot arm are coupled by the electromagnetic clutch, the motor and the robot arm are separated from each other at the time of power supply loss or emergency stop. As a result, a situation to deteriorate safety, for example, unintentional operation by inertia derived from previous operation or an unexpected fall due to a weight of the device may occur on the robot arm. Accordingly, in consideration of safety to the environment around the robot arm, it is necessary to separately provide any means for safety measures that, for example, instantaneously stops the robot arm when power supply loss or emergency stop occurs. Further, although the torque limiter disclosed in Patent Literature 1 cannot make a torque limit value as an upper limit value of the torque transmitted from the input side to the output side variable, if the torque limit value can be optionally varied, it is possible to achieve various kinds of functions for transmission torque control, safety, direct teaching, and the like.

The present invention is devised by paying attention to such issues, and an object of the present invention is to provide a torque limiter that makes the torque limit value in transmission of the torque from the input side to the output side variable, and considers safety at the time of unexpected power supply loss such as blackout, or emergency stop.

Solution to Problem

To achieve the object, according to the present invention, mainly provided is a torque limiter that is disposed between an input-side member and an output-side member to electromagnetically adjust a torque limit value as an upper limit value of torque transmitted from the input-side member to the output-side member. The torque limiter includes an input unit connected to the input-side member, and an output unit connected to the output-side member. The input unit and the output unit include a coupling structure in which the input unit and the output unit approach and recede from each other to enable switching of a connecting state where the input unit and the output unit are connected to each other and a non-connecting state where the input unit and the output unit are not connected to each other, through adjustment of magnetic force between the input unit and the output unit. The coupling structure includes an electromagnet that enables adjustment of the magnetic force through adjustment of an application voltage, is set to the connecting state when the application voltage is zero and is put into the non-connecting state when the application voltage has a predetermined value, and is put into the connecting state to increase joining force between the input unit and the output unit and to increase the torque limit value when the application voltage is increased in the non-connecting state.

Advantageous Effects of Invention

According to the present invention, the torque limit value can be changed through adjustment of the application voltage, and it is possible to achieve various kinds of functions for transmission torque control, safety, direct teaching, and the like when the torque limiter is used in various mechanical elements including a robot. Further, when the application voltage is zero, the connecting state is secured between the input unit and the output unit, the input side including the power supply does not idle, which makes it possible to improve safety at the time of unexpected power supply loss such as blackout, or emergency stop. In other words, in a case where a driving device driven by a power supply is disposed on the input side, driving of the driving device is also stopped by power supply loss or the like. However, since the output side is coupled to the driving device, the output side can be braked with use of driving resistance of the driving device. Accordingly, it is possible to secure safety of surroundings in an unexpected situation such as power supply loss with eliminating necessity of a configuration in which another emergency brake or the like is separately provided or simplifying the configuration.

DESCRIPTION OF EMBODIMENTS

Some embodiments of the present invention are described below with reference to drawings.

First Embodiment

Figure 1:
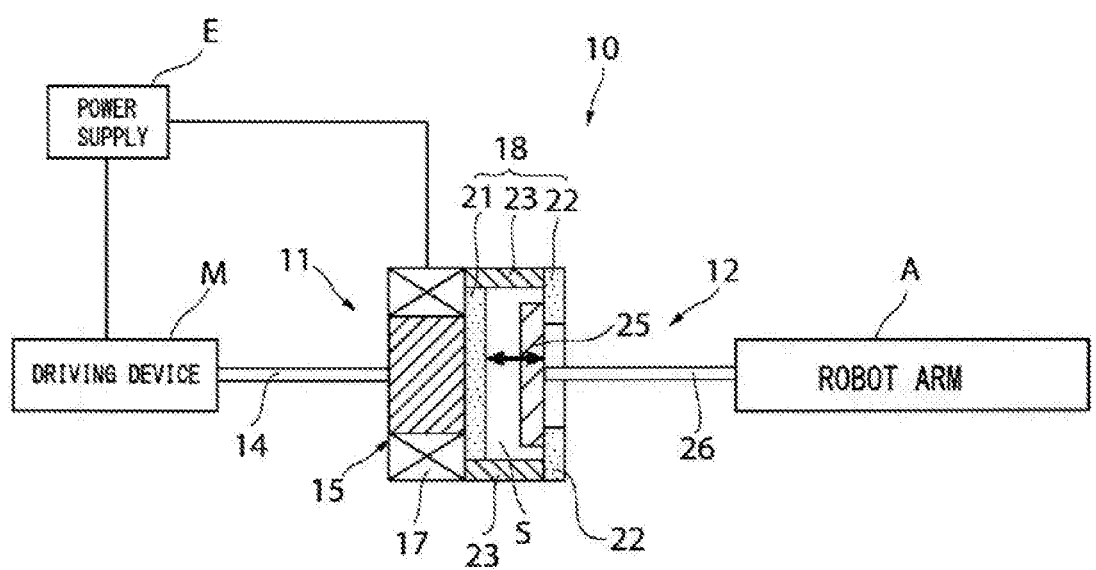
FIG. 1 is a conceptual diagram illustrating a power transmission configuration including a torque limiter according to a first embodiment.

FIG. 1 is a conceptual diagram illustrating a power transmission configuration including a torque limiter according to a first embodiment. In the figure, for example, a torque limiter 10 is provided between a driving device M such as a motor serving as a power supply and a robot arm A that is operated by power from the driving device M, and transmits torque from the driving device M to the robot arm A. When torque exceeding a torque limit value that is an upper limit value of the torque acts, the torque limiter 10 interrupts transmission of the torque.

The torque limiter 10 is configured by an electromagnetic friction clutch. The torque limiter 10 includes an input unit 11 connected to the driving device M as an input-side member and an output unit 12 connected to the robot arm A as an output-side member, causes the input unit 11 and the output unit 12 to approach and recede from each other by action of magnetic force, and performs frictional coupling and separation thereof to transmit and interrupt the torque between the input unit 11 and the output unit 12.

The input unit 11 includes an input shaft 14 that is rotated by the power from the driving device M, and a main body 15 that is fixed to front end side of the input shaft 14 and serves as a joining part with the output unit 12 side.

The main body 15 includes an electromagnet 17 that enables adjustment of generated magnetic force through adjustment of an application voltage supplied from a power supply E, and a joining portion 18 that enables joining with the output unit 12 by using contact friction with the output unit 12.

The joining portion 18 includes a disc-shaped first input plate 21, a second input plate 22, and a cylindrical connection member 23. The first input plate 21 is located on the electromagnet 17 side. The second input plate 22 is disposed closer to the output unit 12 than the first input plate 21 and has a doughnut plate shape provided with a hole at a center. The connection member 23 connects the first and second input plates 21 and 22 to each other on outer peripheral side thereof. A movement space S for the output unit 12 is formed among the first and second input plates 21 and 22 and the connection member 23.

The output unit 12 includes a disc-shaped output plate 25 and an output shaft 26. The output plate 25 is disposed so as to be movable in the movement space S between the first and second input plates 21 and 22. The output shaft 26 couples and fixes the output plate 25 and the robot arm A to each other.

The output plate 25 is made of a material that can be attracted toward the first input plate 21 by the magnetic force of the electromagnet 17, is disposed so as to face each of the first and second input plates 21 and 22, and is movable in a direction approaching and receding from these input plates 21 and 22. Further, the output plate 25 is disposed in a state illustrated in FIG. 1, namely, so as not to be in contact with the first input plate 21 and so as to be in contact with the second input plate 22, in a non-energized state where energization from the power supply E to the electromagnet 17 is not performed.

Although not illustrated, pressing means configured by an urging member including a spring is provided between the input unit 11 and the output unit 12, and the pressing means applies, to the output plate 25, force in a direction causing the output plate 25 to approach the second input plate 22.

Further, as described below, the first and second input plates 21 and 22 can transmit the torque from the input unit 11 to the output unit 12 through mutual contact using the contact friction with the output plate 25. In each of the input plates 21 and 22, at least a contact surface with the output plate 25 is made of a friction material that generates contact friction force enabling the torque transmission. As the friction material, a material having a property not inhibiting action of the magnetic force between the input unit 11 and the output unit 12 described below.

In the torque limiter 10 having the above-described configuration, the output plate 25 can approach and recede from the first and second input plates 21 and 22 by the magnetic force of the electromagnet 17 generated in energization from the power supply E, and a connecting state of the input unit 11 and the output unit 12 caused by friction joining therebetween and a non-connecting state of the input unit 11 and the output unit 12 are switchable by changing the application voltage to the electromagnet 17. At this time, when torque equal to or lower than joining force as the contact friction force acts between the input unit 11 and the output unit 12 in the connecting state, the input unit 11 and the output unit 12 are connected so as not to be relatively rotatable, and driving force from the driving device M is transmitted to the robot arm A. In contrast, when torque exceeding the joining force acts between the input unit 11 and the output unit 12 in the connecting state, the input unit 11 and the output unit 12 are relatively rotatable. As a result, as with the non-connecting state, the input unit 11 idles and the driving force from the driving device M is not transmitted to the robot arm A. Accordingly, the torque corresponding to the joining force becomes a torque limit value that is an upper limit value of the torque transmitted from the input unit 11 to the output unit 12.

In the torque limiter 10, as described in detail below, the torque limit value is varied by changing the application voltage to the electromagnet 17.

Figure 2A:
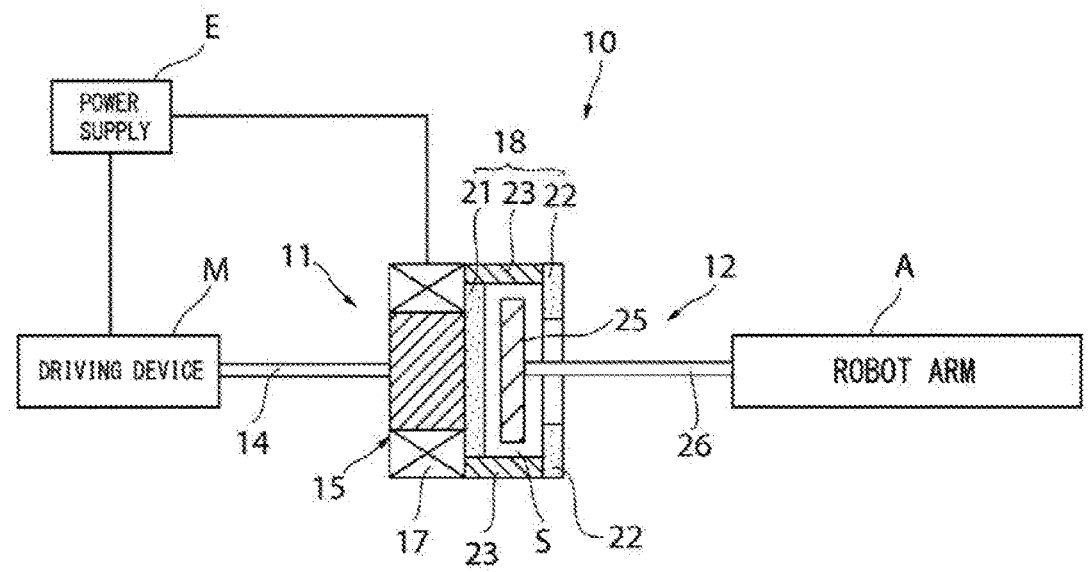
FIGS. 2(A) and 2(B) are conceptual diagrams to explain actuation of the torque limiter.
Figure 2B:
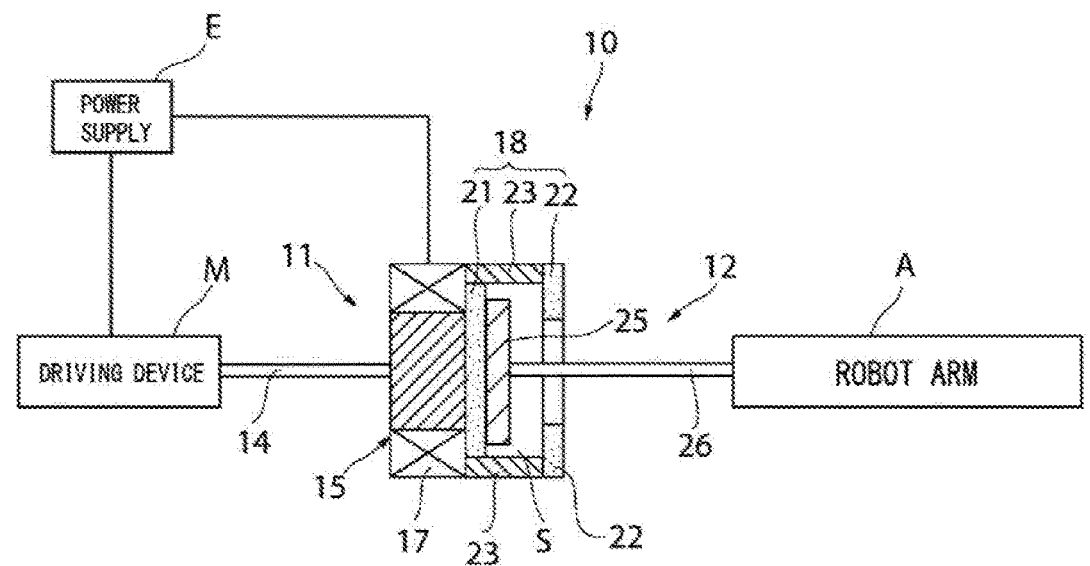

First, in the non-energized state where energization from the power supply E to the electromagnet 17 is not performed, the connecting state where the output plate 25 is not in contact with the first input plate 21 but is in contact with the second input plate 22 is established as illustrated in FIG. 1, and the torque can be transmitted between the input unit 11 and the output unit 12 by the friction joining at this time. When energization to the electromagnet 17 is performed in this state, the output plate 25 is attracted toward the first input plate 21 by the magnetic force, which gradually reduces the joining force as the contact friction force with the second input plate 22. As a result, as illustrated in FIG. 2(A), the output plate 25 recedes from the second input plate 22 and is then moved toward the first input plate 21 in the movement space S. At this time, when the application voltage is increased, the output plate 25 is put into the connecting state where the output plate 25 is in contact with the first input plate 21 but is not in contact with the second input plate 22 as illustrated in the same figure (B) through the non-connecting state where the output plate 25 is not in contact with both of the first and second input plates 21 and 22 as illustrated in the same figure (A). When the application voltage is further increased, attraction force toward the first input plate 21 is increased, which increases the joining force with the first input plate 21.

Note that the second input plate 22 has an outer diameter substantially equal to an outer diameter of the first input plate 22; however, a contact area of the second input plate 22 with the output plate 25 is smaller as compared with the first input plate 21 due to the center hole. The maximum torque limit value when the second input plate 22 and the output plate 25 are joined is set smaller than the maximum torque limit value when the first input plate 21 and the output plate 25 are contacted, because of the shape, magnitude of generatable magnetic force, etc.

Figure 3:
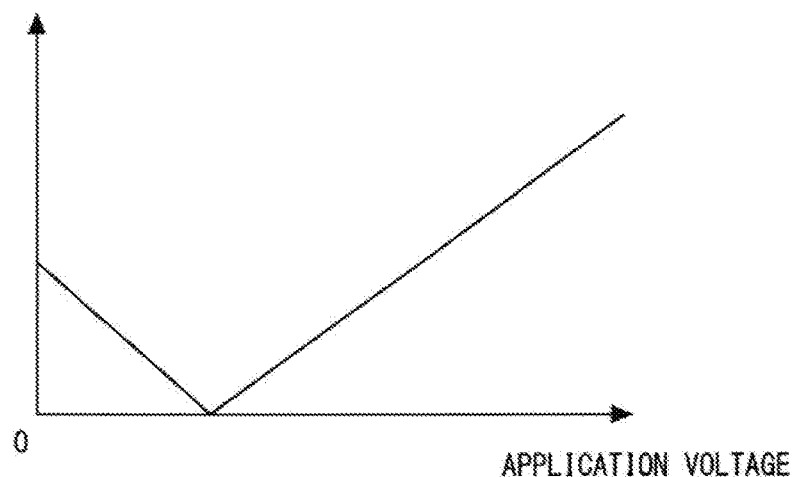
FIG. 3 is a graph illustrating relationship between an application voltage and a torque limit of the torque limiter according to the first embodiment.

According to the torque limiter 10, change characteristics of the torque limit value to the application voltage illustrated in FIG. 3 can be obtained by relative movement of the input unit 11 and the output unit 12 as described above.

When the application voltage to the electromagnet 17 is zero in the non-energized state, the input unit 11 and the output unit 12 are put into the connecting state by surface contact between the second input plate 22 and the output plate 25, and the certain torque limit value is obtainable.

Thereafter, when the energization to the electromagnet 17 is started and the application voltage is increased, the output plate 25 is attracted toward the first input plate 21, the joining force with the second input plate 22 is gradually weakened to gradually reduce the torque limit value. When the application voltage becomes a certain value, the output plate 25 recedes from the input plate 22 and the input unit 11 and the output unit 12 are put into the non-connecting state. Further, the torque limit value becomes zero.

Thereafter, when the application voltage is further increased, the output plate 25 comes into surface contact with the first input plate 21, and the input unit 11 and the output unit 12 are put into the connecting state again. When the application voltage is further increased, the attraction force of the first input plate 21 with respect to the output plate 25 is gradually increased to increase the joining force thereof, and the torque limit value is increased in proportion to the magnitude of the application voltage.

Note that the input unit 11 and the output unit 12 can adopt any of various structures and configurations as long as the input unit 11 and the output unit 12 have a coupling structure in which the input unit 11 and the output unit 12 approach and recede from each other to enable switching of the connecting state where the input unit 11 and the output unit 12 are connected to each other and the non-connecting state where the input unit 11 and the output unit 12 are not connected to each other by adjusting the magnetic force therebetween by the electromagnet or the like through application of the voltage, the connecting state is set when the application voltage is zero and the non-connecting state is established when the application voltage has a predetermined value, and the connecting state is established to increase the torque limit value when the application voltage is increased in the non-connecting state.

Next, another embodiment of the present invention is described. Note that, in the following description, the components same as or equivalent to the components of the first embodiment are denoted by the same reference numerals, and description of the components is omitted or simplified.

Second Embodiment

Figure 4:
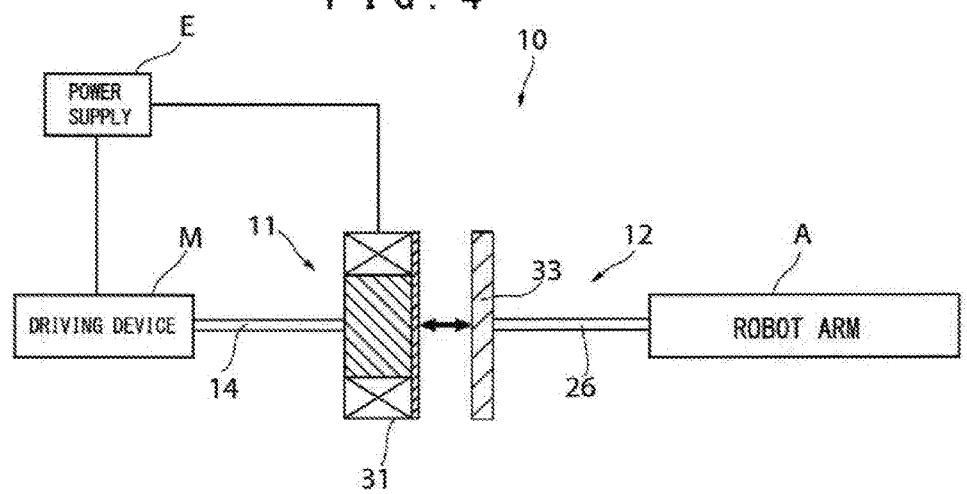
FIG. 4 is a conceptual diagram illustrating a power transmission configuration including a torque limiter according to a second embodiment.

As illustrated in FIG. 4, a torque limiter 10 according to the present embodiment is characterized in that the input unit 11 and the output unit 12 are configured so as to be partially different from those in the torque limiter 10 according to the first embodiment.

The input unit 11 includes the input shaft 14, and an input plate 31 that is fixed to front end side of the input shaft 14 and serves as a joining part with the output unit 12. The input plate 31 is configured by an electromagnet that can vary generated magnetic force according to the magnitude of the application voltage from the power supply E.

The output unit 12 includes the output shaft 26 and a disc-shaped output plate 33 that is provided so as to approach and recede from the input plate 31. The output plate 33 is made of a magnetic body such as neodymium magnet.

Although not illustrated, pressing means that applies pressing force in a direction in which the input plate 31 and the output plate 33 are brought into contact with each other is provided between the input unit 11 and the output unit 12. The pressing means causes the connecting state of the input unit 11 and the output unit 12 with a certain constant torque limit value even in the non-energized state, as with the first embodiment.

The pressing means is configured by, for example, an urging member including a spring that applies force in a direction in which the output plate 33 is pressed against the input plate 31. The pressing means enables the joining of the input plate 31 and the output plate 33 with the friction force by using the pressing force. At this time, to adjust the friction force, the above-described friction material may be provided on at least one of the contact surface of the input plate 31 and the contact surface of the output plate 33. Further, an engaging member (not illustrated) that relatively unrotatably engages with the input plate 31 and the output plate 33 when the input plate 31 and the output plate 33 are in contact with each other, may be provided without providing the friction material or together with the friction material. Alternatively, for example, microscopic irregularity may be formed on each of the contact surface of the input plate 31 and the contact surface of the output plate 33.

The torque limiter 10 according to the present embodiment is actuated as follows.

First, in the non-energized state where energization from the power supply E is not performed on the input plate 31 including the electromagnet, the connecting state where the input plate 31 and the output plate 33 are in contact with each other is established, and the torque can be transmitted between the input unit 11 and the output unit 12. When a positive voltage is applied to the input plate 31 in this state, attraction force of the output plate 33 with respect to the input plate 31 by the magnetic force is increased, and joining force between the input plate 31 and the output plate 33 is increased.

In contrast, when a negative voltage is applied to the input plate 31 in the non-energized state, polarity of the magnet in the input plate 31 is reversed from polarity in the case where the positive voltage is applied, which causes repulsive force of the output plate 33 with respect to the input plate 31. Accordingly, the joining force of the output plate 33 with the input plate 31 is gradually reduced as the negative voltage applied to the input plate 31 is increased in a negative direction. When the application voltage has a predetermined negative value or more, the input unit 11 and the output unit 12 are put into the non-connecting state illustrated in FIG. 4.

Figure 5:
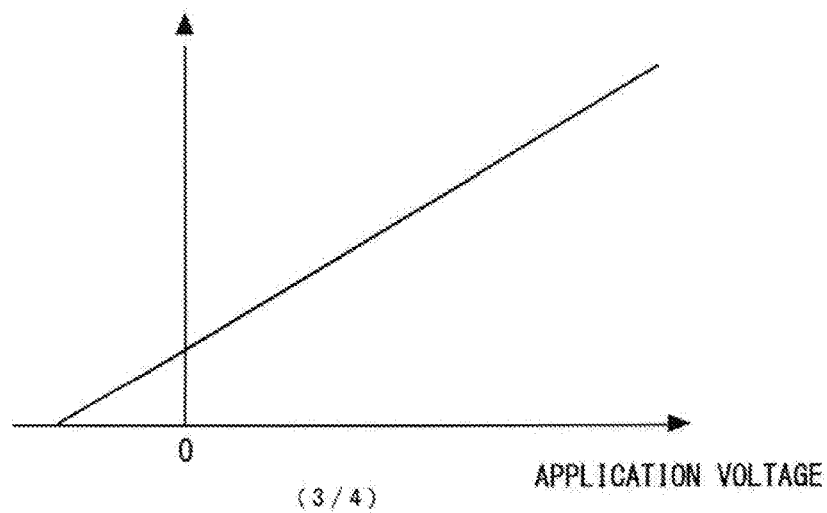
FIG. 5 is a graph illustrating relationship between an application voltage and a torque limit of the torque limiter according to the second embodiment.

The change characteristics of the torque limit value to the application voltage illustrated in FIG. 5 can be obtained by relative movement of the input unit 11 and the output unit 12 as described above. In other words, when the negative application voltage to the input plate 31 is reduced from the application voltage having a predetermined negative value at which the input unit 11 and the output unit 12 are in the non-connecting state, the input unit 11 and the output unit 12 are put into the connecting state by the pressing means, and the repulsive force of the output plate 33 with respect to the input plate 31 is gradually reduced and the torque limit value is gradually increased. Further, even in the non-energized state where the application voltage is zero, a certain constant torque limit value is obtainable. When the positive voltage is applied to the input plate 31 in the non-energized state, the attraction force of the output plate 33 with respect to the input plate 31 is gradually increased, and the torque limit value is increased in proportion to the application voltage.

Note that action by the "positive" and "negative" application voltages in the present embodiment is not limited, and similar action effects may be achieved by reversing the polarity. In other words, the attraction force may be generated with the negative application voltage while the repulsive force may be generated by the positive application voltage.

According to the above-described first and second embodiments, it is possible to adjust the torque limit value by adjusting the application voltage to the input unit 11, and also to secure the connecting state of the input unit 11 and the output unit 12 to obtain the certain constant torque limit value in the non-energized state. Therefore, at the time of power supply loss to the input unit 11 such as blackout, emergency stop, or the like, the connecting state of the input unit 11 and the output unit 12 is not canceled, and the connection with the certain constant torque limit value is maintained. Accordingly, at this time, it is possible to brake inertial operation of the robot arm A with use of stoppage of the driving device M due to power supply loss or the like, and it is possible to avoid unexpected collision with a human and an object around the robot arm A due to the inertial operation, thereby improving safety.

Further, since the electromagnetic friction clutch that frictionally couples the input unit 11 and the output unit 12 by action of the magnetic force is used, it is possible to secure a high torque/mass ratio and back drivability at the time of blackout.

Note that the input unit 11 and the output unit 12 are not limited to the aspect of each of the embodiments, and can adopt any of various configurations as long as the input unit 11 and the output unit 12 have the following coupling structure adopted in each of the embodiments.

In other words, the input unit 11 and the output unit 12 can adopt any of various structures as long as the coupling structure is a structure in which the input unit 11 and the output unit 12 approach and recede from each other to enable switching of the connecting state where the input unit 11 and the output unit 12 are connected to each other and the non-connecting state where the input unit 11 and the output unit 12 are not connected to each other by adjusting the magnetic force therebetween by the electromagnet or the like through application of the voltage, the connecting state is established when the application voltage is zero and the non-connecting state is established when the application voltage has a predetermined value, and the connecting state is established to increase the torque limit value when the application voltage is increased in the non-connecting state.

Further, in each of the embodiments, power-supply backup means that is actuated when the power supply E supplying the application voltage to the electromagnet 17 of the torque limiter 10 or the electromagnet 31 of the torque limiter 10 is shut off can be further provided. The power-supply backup means includes a control circuit that is charged during energization by the power supply E, and uses the charged power to supply power to the electromagnet 17 or 31 on behalf of the power supply E when the power supply E is shut off.

Figure 6:
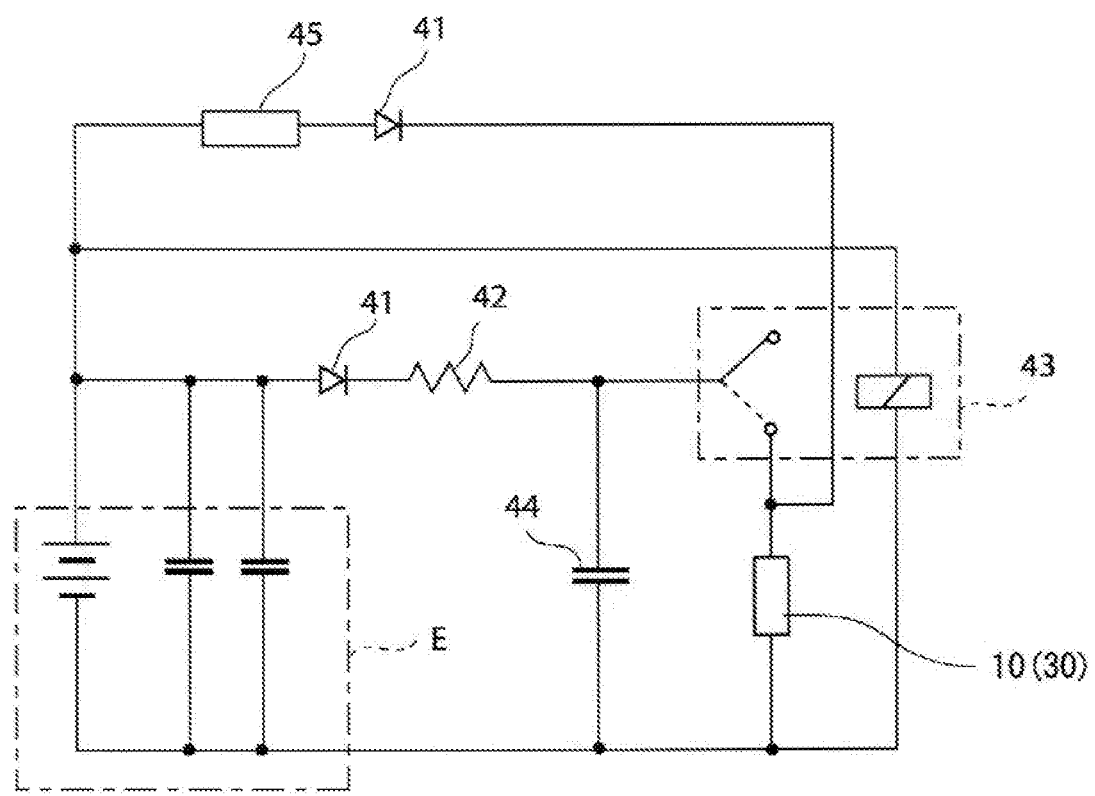
FIG. 6 is a circuit diagram of a control circuit configuring power-supply backup means.

As illustrated in FIG. 6, the control circuit includes a diode 41, a resistor 42, a relay switch 43, a capacitor 44, a controller 45 that adjusts the application voltage of the power supply E, and the like. In other words, in the control circuit, power supply to the torque limiter 10 is performed and charging is performed with use of the capacitor 44 in the energized state. In contrast, when the power supply E is lost, the relay switch 43 is switched to a position illustrated by a dashed line in the same figure, and the power supply to the torque limiter 10 is performed with use of the charged power in the capacitor 44.

According to the modification, when the power supply to the input unit 11 is lost at the time of blackout or the like, it is possible to return the input unit 11 and the output unit 12 to the state with the torque limit value higher than the non-energized state in a short time by using the power previously charged. Accordingly, even when the power supply loss such as blackout occurs, the robot arm A can be continuously operated.

Note that the torque limiter 10 according to the present invention is applicable to a general power transmission system such as a machine and device in addition to a robot having the other configuration, without being limited to the application example in the embodiments.

Further, the components of the input unit 11 and the components of the output unit 12 according to the aspect of each of the embodiments may be reversely disposed between the input unit 11 and the output unit 12.

Other than the above, the configurations of the units in the device according to the present invention are not limited to the illustrated configuration examples, and can be variously modified in so far as a modification has substantially similar action.

REFERENCE SIGNS LIST

10 Torque limiter
11 Input unit
12 Output unit
15 Main body
17 Electromagnet
18 Joining portion
21 First input plate
22 Second input plate
25 Output plate
30 Torque limiter
31 Input plate
33 Output plate
A Robot arm (output-side member)
E Power supply
M Driving device (input-side member)
S Movement space

The invention claimed is:
1. A torque limiter that is disposed between an input-side member and an output-side member to electromagnetically adjust a torque limit value as an upper limit value of torque transmitted from the input-side member to the output-side member, the torque limiter comprising:
- an input unit connected to the input-side member; and
- an output unit connected to the output-side member, wherein
- the input unit and the output unit include a coupling structure in which the input unit and the output unit approach and recede from each other to enable switching of a connecting state where the input unit and the output unit are connected to each other and a non-connecting state where the input unit and the output unit are not connected to each other, through adjustment of magnetic force between the input unit and the output unit,
- the coupling structure includes an electromagnet that enables adjustment of the magnetic force through adjustment of an application voltage,
- the coupling structure is set to the connecting state when the application voltage is zero,
- upon increasing the application voltage from zero, the coupling structure is put into the non-connecting state when the application voltage has a predetermined value, and
- when the application voltage is increased from the predetermined value, the coupling structure is put into the connecting state, with further increase in the application voltage thereafter during the connecting state increasing a joining force between the input unit and the output unit and increasing the torque limit value.

2. The torque limiter according to claim 1, wherein, the coupling structure is provided as a structure in which, when the application voltage is gradually increased from zero, the torque limit value is gradually reduced to establish the non-connecting state.

3. The torque limiter according to claim 1, wherein the coupling structure is provided as a structure in which the non-connecting state is established when the application voltage is set to a predetermined negative value, and the torque limit value is gradually increased when the application voltage is changed from the negative value to zero.

4. The torque limiter according to claim 1, further comprising power-supply backup means that is actuated when a power supply supplying the application voltage to the electromagnet is shut off, wherein
- the power-supply backup means includes a control circuit that is charged during energization by the power supply, and uses the charged power to supply power to the electromagnet on behalf of the power supply when the power supply is shut off.

5. A torque limiter that is disposed between an input-side member and an output-side member to electromagnetically adjust a torque limit value as an upper limit value of torque transmitted from the input-side member to the output-side member, the torque limiter comprising:
- an input unit connected to the input-side member; and
- an output unit connected to the output-side member, wherein
- the input unit includes an electromagnet that is changeable in generated magnetic force according to a magnitude of an application voltage, and a joining portion that enables joining with the output unit by contact friction with the output unit,
- the joining portion includes a first input plate located on the electromagnet side, and a second input plate disposed closer to the output unit than the first input plate,
- the output unit includes an output plate that is disposed to be movable between the first and second input plates by change of the magnetic force, and
- when the application voltage is zero, the output plate is in a connecting state where the output plate is in contact with the second input plate to connect the input unit and the output unit to each other,
- when the application voltage is increased from zero, the output plate recedes from the second input plate and is attracted toward the first input plate, and comes into contact with the first input plate to be put into the connecting state through a non-connecting state where the output plate is also not in contact with the first input plate, and
- when the output plate is in contact with the first input plate, joining force with the first input plate is increased to increase the torque limit value as the application voltage to the electromagnet is increased.

6. The torque limiter according to claim 5, wherein, in the input unit, a maximum torque limit value in the connecting state where the second input plate and the output plate are in contact with each other is set smaller than a maximum torque limit value in the connecting state where the first input plate and the output plate are in contact with each other.

7. A torque limiter that is disposed between an input-side member and an output-side member to electromagnetically adjust a torque limit value as an upper limit value of torque transmitted from the input-side member to the output-side member, the torque limiter comprising:
- an input unit connected to the input-side member; and
- an output unit connected to the output-side member, wherein
- the input unit includes an input plate configured by an electromagnet that is changeable in generated magnetic force according to a magnitude of an application voltage,
- the output unit includes an output plate configured by a magnetic body approaching and receding from the input plate, and
- the input plate and the output plate are provided to be changeable, by changing a polarity of the application voltage, between a state where the input plate and the output plate mutually repel and move in a receding direction and a state where the input plate and the output plate mutually attract and move in an approaching direction, and are put into a connecting state where the input plate and the output plate are in contact with each other to connect the input unit and the output unit to each other when the application voltage is zero.

8. The torque limiter according to claim 7, wherein the input plate and the output plate are put into a non-connecting state where the input plate and the output plate are not in contact with each other when the application voltage has a predetermined negative value, and are put into the connecting state to gradually increase joining force and to gradually increase the torque limit value when the application voltage is changed in a positive direction in the non-connecting state.

9. The torque limiter according to claim 7, wherein pressing means that applies pressing force bringing the input plate and the output plate into contact with each other when the application voltage is zero, is provided between the input unit and the output unit.

* * * * *